United States Patent
Crume et al.

(10) Patent No.: US 9,133,061 B2
(45) Date of Patent: Sep. 15, 2015

(54) CERAMICS MANUFACTURE USING RAPIDLY DISSOLVABLE CELLULOSIC BINDER

(75) Inventors: Gregg William Crume, Canandaigua, NY (US); Robert John Locker, Corning, NY (US); Earl James Sanford, Campbell, NY (US)

(73) Assignee: Corning Incorporated, Corning, NY (US)

(*) Notice: Subject to any disclaimer, the term of this patent is extended or adjusted under 35 U.S.C. 154(b) by 639 days.

(21) Appl. No.: 13/262,058

(22) PCT Filed: Apr. 1, 2010

(86) PCT No.: PCT/US2010/029622
§ 371 (c)(1),
(2), (4) Date: Sep. 29, 2011

(87) PCT Pub. No.: WO2010/114994
PCT Pub. Date: Oct. 7, 2010

(65) Prior Publication Data
US 2012/0025432 A1    Feb. 2, 2012

Related U.S. Application Data

(60) Provisional application No. 61/166,275, filed on Apr. 3, 2009.

(51) Int. Cl.
*B29C 47/10* (2006.01)
*C04B 35/636* (2006.01)
(Continued)

(52) U.S. Cl.
CPC ......... *C04B 35/6365* (2013.01); *C04B 38/0006* (2013.01); *B28B 3/20* (2013.01); *C04B 2111/00129* (2013.01); *C04B 2235/6021* (2013.01)

(58) Field of Classification Search
CPC .............. C04B 38/0006; C04B 2111/00129; C04B 2235/6021; C04B 35/00; C04B 35/6365; C04B 38/0645; B28B 3/20
USPC ............................................ 264/211.11, 638
See application file for complete search history.

(56) References Cited

U.S. PATENT DOCUMENTS

| | | | |
|---|---|---|---|
| 2,783,129 A * | 2/1957 | Baral | 423/332 |
| 2009/0140452 A1* | 6/2009 | DeRosa et al. | 264/177.11 |
| 2010/0029462 A1 | 2/2010 | DeRosa et al. | 501/80 |

FOREIGN PATENT DOCUMENTS

| | | |
|---|---|---|
| CN | 101001881 | 7/2007 |
| CN | 101089035 | 12/2007 |

(Continued)

OTHER PUBLICATIONS

Ekonomakou, A., et al, "The influence of Binder Properties on the Plasticity and the Properties of Raw Extruded Ceramics", Key Engineering Materials, Trans Tech Publications, Switzerland, vol. 132-136, (Jan. 1, 1997), pp. 420-423.

(Continued)

*Primary Examiner* — Alison Hindenlang
*Assistant Examiner* — Robert J Grun
(74) *Attorney, Agent, or Firm* — Charles A. Greene; Joseph M. Homa; Michelle O'Brien

(57) ABSTRACT

A method for making a ceramic body, the method including: mixing inorganic ceramic-forming ingredients to form a batch; adding a rapidly hydratable cellulosic binder and a liquid vehicle to the batch and further mixing to form a plasticized mixture; extruding the plasticized mixture to form a green body. The green body can then be heated sufficiently to produce a predominant ceramic phase, thereby transforming the green body into the ceramic body.

23 Claims, 2 Drawing Sheets

100μm

(51) Int. Cl.
*C04B 38/00* (2006.01)
*C04B 111/00* (2006.01)
*B28B 3/20* (2006.01)

(56) References Cited

FOREIGN PATENT DOCUMENTS

| EP | 1316538 | 4/2003 | |
|---|---|---|---|
| EP | 1 698 388 | 9/2006 | B01D 39/20 |
| JP | 2009/061751 | 3/2009 | |

OTHER PUBLICATIONS

Sarkar, N., et al, "Hydration-dehydration properties of methylcellulose and hydroxypropylmethylcellulose", Carbohydrate Polymers, Applied Science Publishers, vol. 27, No. 3, (Jan. 1, 1995), pp. 177-185.

* cited by examiner

100μm

CERAMICS MANUFACTURE USING RAPIDLY DISSOLVABLE CELLULOSIC BINDER

CROSS REFERENCE TO RELATED APPLICATION

This application claims the benefit of priority to U.S. Provisional Application No. 61/166,275, filed on Apr. 3, 2009.

FIELD

The disclosure is generally directed to methods for making a ceramic body by using a cellulosic binder material.

BACKGROUND

Exhaust gases emitted by internal combustion systems utilizing hydrocarbon fuels, such as hydrocarbon gases, gasoline, or diesel fuel, can cause serious pollution of the atmosphere. Among the many pollutants in these exhaust gases are hydrocarbons and oxygen-containing compounds, the latter including nitrogen oxides ($NO_x$) and carbon monoxide (CO). The automotive industry has, for many years, attempted to reduce the quantities of pollutants from automobile engine systems, the first automobiles equipped with catalytic converters having been introduced in the mid 1970's. Cordierite substrates, typically in the form of a honeycomb body, have long been preferred for use as substrates to support catalytically-active components for catalytic converters on automobiles.

Aluminum titanate (AT) ceramics have emerged as an excellent candidate for high-temperature applications. To achieve the desired porosity in such aluminum titanate materials, graphite pore formers have been added to the inorganic batch materials.

SUMMARY

The disclosure relates to a method for making a ceramic body, the method comprising: mixing inorganic ceramic-forming ingredients to form a batch; adding a rapidly hydratable cellulosic binder and a liquid vehicle to the batch and further mixing to form a plasticized mixture; extruding the plasticized mixture to form a green body. The green body can then be heated sufficiently to produce a predominant ceramic phase, thereby transforming the green body into the ceramic body.

BRIEF DESCRIPTION OF THE DRAWING(S)

DETAILED DESCRIPTION

Figure 1:
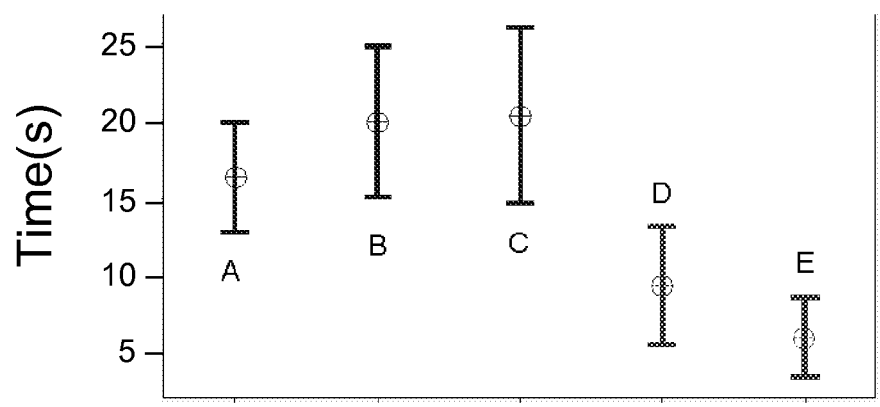
FIG. 1 shows hydration rates for methylcellulose samples A-C and rapidly hydratable methylcellulose samples D-E.

Various embodiments of the disclosure will be described in detail with reference to drawings, if any. Reference to various embodiments does not limit the scope of the invention, which is limited only by the scope of the claims attached hereto. Additionally, any examples set forth in this specification merely set forth some of the many possible embodiments for the claimed invention.

"Gelation temperature" refers to the temperature at which a batch has stiffened to such an extent that it cannot effectively be extruded.

"$T_{onset}$" refers to the temperature at which the rheology of the batch begins to transition from low to high viscosity.

"Include," "includes," or like terms means including but not limited to, i.e., inclusive and not exclusive.

"About" modifying, for example, the quantity of an ingredient in a composition, concentrations, volumes, process temperature, process time, yields, flow rates, pressures, film thickness, and like values, and ranges thereof, employed in describing the embodiments of the disclosure, refers to variation in the numerical quantity that can occur, for example: through typical measuring and handling procedures used for making compounds, compositions, concentrates or use formulations; through inadvertent error in these procedures; through differences in the manufacture, source, or purity of starting materials or ingredients used to carry out the methods; and like considerations. The term "about" also encompasses amounts that differ due to aging, for example, of a composition or formulation with a particular initial concentration or mixture, and amounts that differ due to mixing or processing a composition or formulation with a particular initial concentration or mixture. Whether modified by the term "about" the claims appended hereto include equivalents to these quantities.

Green body, or green ceramic body, refers to a body, such as an extruded body, which when heated (or fired) to produce a predominant ceramic phase (such as cordierite or aluminum titanate) which results in a fired ceramic body. The green body contains precursors of the ceramic of the predominant ceramic phase, and may optionally contain an amount of the ceramic itself.

We have found that the use of a rapidly hydratable cellulosic binder, such as methylcellulose, allows for quick extrusion operations of thin cell wall products where high density extrusion screens are used to eliminate coarse particles that would otherwise block the die. Binders that dissolve quickly are favored because they do not temporarily block screens meant to eliminate coarse particles from reaching the die in rapid extrusion processes where there is, for example, less than an hour for dry powders to be formed (by way of plasticized batch which is extruded) into an intricate structure, such as a cellular structure like a honeycomb structure. The binder attribute of rapid hydration (or dissolution) can be provided through appropriate substitution chemistry of methoxy and hydroxypropyl side groups and by particle morphology, for example methylcellulose particle morphology. The binder (such as methylcellulose) particles preferably are essentially free, and more preferably free, of insoluble fiber (such as when adequate chemical substitution has occurred). The binder (such as methylcellulose) particles also preferably have a dense particle character, preferably essentially free, and more preferably free, of internal porosity or internal surfaces that tend to limit liquid-solid interfaces where dissolution occurs. The dense particles also preferably have a thin cross-section, helping to limit diffusion path of water in dissolution.

As used herein, cellulosic particles are reported as being capable of hydrating as measured according to the following procedure to determine an average isolated particle hydration rate. By way of example, the procedure is described for methylcellulose, but the procedure can be utilized on other cellulosic binders. First, the particles (or fibers) that make up the methylcellulose sample are widely dispersed onto a glass microscope slide, for example by tapping a lightly coated spatula that had most of the methylcellulose dropped off of it prior to attempting to transfer the methylcellulose fiber onto the microscope slide. A coverslip is then placed over the methylcellulose fibers on the microscope slide. The slide is then transferred to an optical microscope where the operator scans the slide to find an area of methylcellulose fiber to examine. The magnification used for this examination is 100×, but can vary somewhat based on the size of the fibers being examined. Preferably, the selected microscope optics should make the methylcellulose fiber fill the field of view used by a video capture device. Using the video capture device in preview mode, the methylcellulose fiber of interest should lie completely within the image to be captured. Once the methylcellulose fiber location is suitably within the video field, video capture is started and a drop of water is added at the edge of the coverslip, i.e. an amount sufficient to allow the water to travel far enough under the coverslip to come into contact with the fiber/particle. Video capturing continues until the fiber has completely dissolved. If the fiber floats out of the field of view the data point is rejected. The captured video can be saved for later analysis using an image analysis software package, such as ImageJ. Using the captured video, determine the time that the water first comes into contact with the fiber and the time fiber is completely dissolved. The difference between these two times is the amount of time for this fiber to dissolve. The fiber size, its length, width or area, can be measured from the video prior to water contact if there is a desire to correlate the dissolution time to the fiber size. There is no counting of time taken for any gaseous bubbles that form to disappear or move out of the field of view. These steps must be repeated several times in order to gain enough information to determine an average hydration rate for the sample, preferably a minimum of 10 times. The fiber must totally visually disappear after it has come into contact with the water. This is referred to herein as an average isolated particle hydration rate, as the particle/fiber is hydrated outside a batch mixture. Useful equipment can include: 1) a light microscope with sufficient magnification to clearly observe individual fibers/particles (100×); 2) a video capture system that can capture video through the microscope, wherein the speed of the video capture device should be high enough to allow differentiation between samples, and speed should be >10 HZ; 3) a computer device with appropriate software to capture the video from the video capture system for storage and/or later analysis; 4) standard microscope slides; 5) slide coverglass, preferably No. 1.5; 6) a spatula to transfer the sample to the microscope slide; 7) water; 8) water droppers to place small droplets of water onto the samples; 9) image analysis software to examine the captured video, wherein the software should be capable of determining the time the various frames of the video were captured as well as sizing of the fiber.

FIG. 1 shows average isolated particle hydration rates, along with variability in hydration rates, for methylcellulose Samples A-E. Higher plugging rates in extrusion screens were associated with Samples A-C, and greatly reduced extrusion screen plugging rates were associated with Samples D-E.

Figure 2:
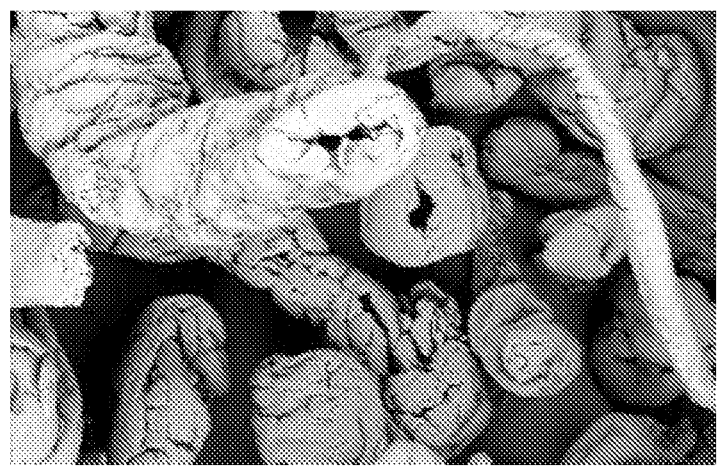
FIG. 2 is an SEM photograph of methylcellulose representative of Samples A-C.
Figure 3:
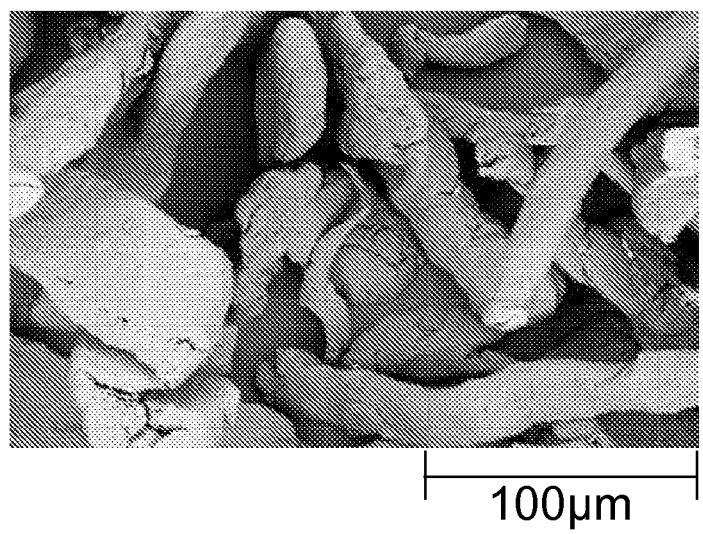
FIG. 3 is an SEM photograph of methylcellulose representative of Samples D-E.

FIG. 2 is an SEM photograph of methylcellulose representative of Samples A-C. FIG. 3 is an SEM photograph of methylcellulose representative of Samples D-E. As seen by comparing FIGS. 2 and 3, the particle morphology of the rapidly hydratable methylcellulose binder is particles/fibers having a flattened ribbon morphology (FIG. 3) while the less hydratable (higher hydration rate) samples (A-C) had a more open, tube-like morphology. In some embodiments, the fibers/particles of a rapidly hydratable methylcellulose binder has a cross-section of 40 to 60 micrometers.

Figure 4:
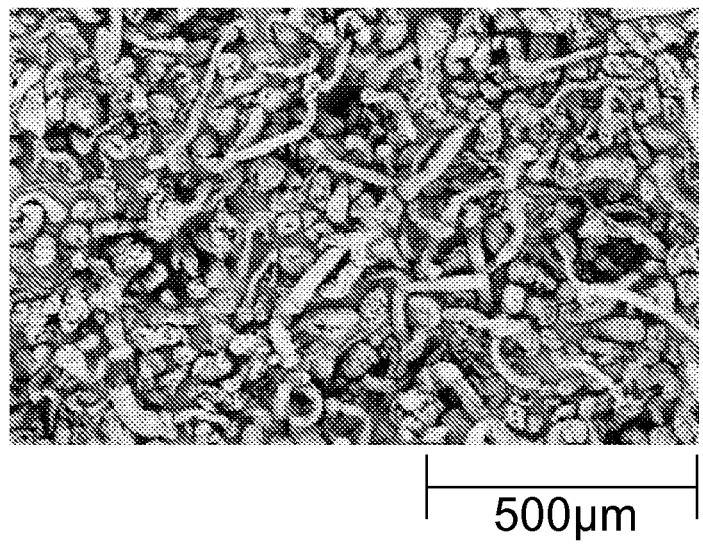
FIG. 4 is a lower magnification SEM photograph of methylcellulose representative of Samples A-C of FIG. 1.
Figure 5:
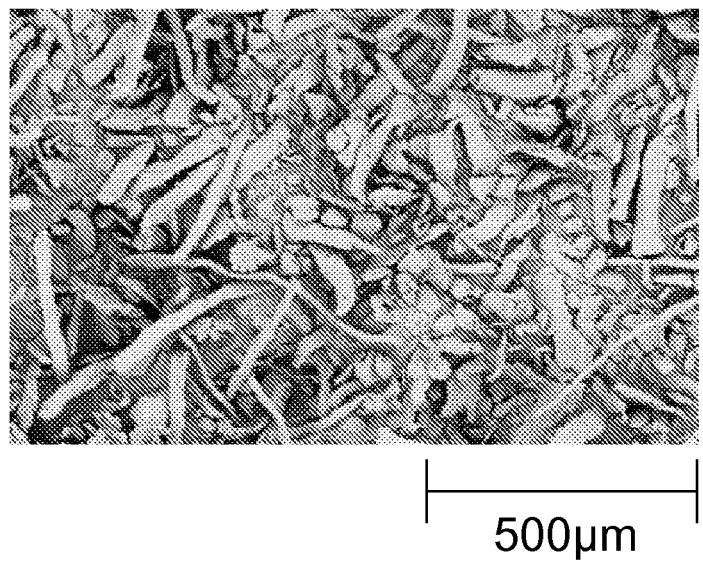
FIG. 5 is a lower magnification SEM photograph of methylcellulose representative of Samples D-E of FIG. 1.

FIG. 4 is a lower magnification SEM photograph of methylcellulose representative of Samples A-C. FIG. 5 is a lower magnification SEM photograph of methylcellulose representative of Samples D-E.

A particle size analyzer such as FlowCAM by Fluid Imaging can be used to compare cellulose based binders for suitability in the extrusion process. For example, we analyzed a 1% solution of hydroxylpropyl methylcellulose (HPMC). Insoluble cellulose fibers, as well as partially hydrated fibers and amorphous gel particles, are easily detected. In one set of embodiments, we found HPMC having a particle count analysis of less than 1000 particles/ml in a 1% solution provided a significant reduction in plugging of extrusion screens during extrusion of thin wall green ceramic honeycomb bodies.

In one aspect, a method is disclosed herein, A method for making a ceramic body, the method comprising: mixing inorganic ceramic-forming ingredients to form a batch; adding a rapidly hydratable cellulosic binder and a liquid vehicle to the batch and further mixing to form a plasticized mixture; extruding the plasticized mixture to form a green body.

In some embodiments, the cellulosic binder is comprised of cellulosic particles, and wherein a majority of the cellulosic particles has an average isolated particle hydration rate of less than 15 seconds, in other embodiments, less than 12 seconds, in other embodiments, less than 10 seconds, and in other embodiments, less than 5 seconds.

In some embodiments, the cellulosic particles are comprised of one or more of the group consisting of methylcellulose, methylcellulose derivatives, and combinations thereof. In some embodiments, the cellulosic particles are comprised of a hydrophobically modified cellulose polymer; in some of these embodiments, the hydrophobically modified cellulose polymer is methylcellulose or hydroxypropyl methylcellulose.

In some embodiments, the cellulosic particles comprise 4.0-7.5 wt % hydroxypropoxyl, 27.0-30.0 wt % methoxyl, and 0.0-1.0 wt % NaCl.

In some embodiments, the cellulosic particles are free of internal porosity.

In some embodiments, wherein the cellulosic particles are free of internal surfaces.

In some embodiments, a substantial portion of the cellulosic particles have a flattened ribbon morphology.

In some embodiments, the cellulosic binder is free of insoluble fiber.

In some embodiments, the plasticized mixture is extruded through an extrusion die having at least one transverse die opening less than 15 microns, in other embodiments, less than 10 microns, in other embodiments, less than 5 microns.

In some embodiments, the plasticized mixture is extruded through an extrusion die having at least one transverse die opening not more than 4 microns.

In some embodiments, the plasticized mixture is extruded through an extrusion screen prior to being extruded through the extrusion die.

In some embodiments, a majority of the cellulosic particles are fully hydrated prior to passing through the extrusion die.

In some embodiments, a majority of the cellulosic particles are fully hydrated prior to passing through the extrusion screen.

In some embodiments, the cellulosic binder is comprised of cellulosic particles, and wherein a majority of the cellulosic particles is capable of hydrating in less than 15 seconds when each of the majority of the cellulosic particles is isolated in a water bath.

In some embodiments, the cellulosic binder is added to the batch in an amount greater than 5 wt % superaddition to the inorganic ceramic-forming ingredients. In some embodiments, the cellulosic binder is added to the batch in an amount greater than 10 wt % superaddition to the inorganic ceramic-forming ingredients.

In some embodiments, the inorganic ceramic-forming ingredients comprise at least one of: cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, silicon carbide, silicon nitride, soda lime, aluminosilicate, borosilicate, soda barium borosilicate, or a mixture of thereof.

In some embodiments, the ceramic-forming ingredients comprise one or more of the group consisting of sources of alumina, titania, silica, and magnesia, and combinations thereof.

In some embodiments, the method further comprises heating the green body sufficient to produce a predominant ceramic phase.

The methods disclosed herein can be advantageously utilized in extrusion processes the produce thin wall (or ultra thin wall) extruded bodies such as honeycomb bodies, wherein the processes utilize extrusion screens that limit coarse material from blinding the die and which otherwise would require frequent die changes that would be deleterious to process efficiency. These screens catch fine particles that would otherwise lodge in the channel of a die possibly leading to rejection of the extruded part. The screens can be designed to catch material over several hours of extrusion operation, and the methods disclosed herein can help to limit the pressure excursions that occur between and/or during screen changes. Further, the frequency of screen changes, which can lead to pressure instability that might also affect skin formation and overall material utilization (MU) performance, can be reduced.

The disclosure has been described with reference to various specific embodiments and techniques. However, many variations and modifications are possible while remaining within the spirit and scope of the disclosure.

What is claimed is:

1. A method for making a ceramic body, the method comprising:
   mixing inorganic ceramic-forming ingredients to form a batch;
   adding a rapidly dissolvable cellulosic binder and a liquid vehicle to the batch and further mixing to form a plasticized mixture;
   extruding the plasticized mixture to form a green body,
   wherein the cellulosic binder is comprised of cellulosic particles, and
   wherein a majority of the cellulosic particles has an average isolated particle dissolution rate of less than 15 seconds, and
   wherein a substantial portion of the cellulosic particles have a flattened ribbon morphology.

2. The method of claim 1, wherein a majority of the cellulosic particles has an average isolated particle dissolution rate of less than 12 seconds.

3. The method of claim 1, wherein a majority of the cellulosic particles has an average isolated particle dissolution rate of less than 10 seconds.

4. The method of claim 1, wherein a majority of the cellulosic particles has an average isolated particle dissolution rate of less than 5 seconds.

5. The method of claim 1, wherein the cellulosic particles are comprised of one or more of the group consisting of methylcellulose, methylcellulose derivatives, and combinations thereof.

6. The method of claim 1, wherein the cellulosic particles are comprised of a hydrophobically modified cellulose polymer.

7. The method of claim 6, wherein the hydrophobically modified cellulose polymer is methylcellulose or hydroxypropyl methylcellulose.

8. The method of claim 1, wherein the cellulosic particles comprise 4.0-7.5 wt % hydroxypropoxyl, 27.0-30.0 wt % methoxyl, and 0.0-1.0 wt % NaCl.

9. The method of claim 1, wherein the cellulosic particles are free of internal porosity.

10. The method of claim 1, wherein the cellulosic particles are free of internal surfaces.

11. The method of claim 1, wherein the cellulosic binder is free of insoluble fiber.

12. The method of claim 1, wherein the plasticized mixture is extruded through an extrusion die having at least one transverse die opening less than 15 microns.

13. The method of claim 1, wherein the plasticized mixture is extruded through an extrusion die having at least one transverse die opening less than 10 microns.

14. The method of claim 1, wherein the plasticized mixture is extruded through an extrusion die having at least one transverse die opening less than 5 microns.

15. The method of claim 1, wherein the plasticized mixture is extruded through an extrusion die having at least one transverse die opening not more than 4 microns.

16. The method of claim 1, wherein the plasticized mixture is extruded through an extrusion screen prior to being extruded through an extrusion die.

17. The method of claim 1, wherein a majority of the cellulosic particles are fully dissolved prior to passing through an extrusion die.

18. The method of claim 1, wherein a majority of the cellulosic particles are fully dissolved prior to passing through an extrusion screen.

19. The method of claim 1, wherein the cellulosic binder is added to the batch in an amount greater than 5 wt % superaddition to the inorganic ceramic-forming ingredients.

20. The method of claim 1, wherein the cellulosic binder is added to the batch in an amount greater than 10 wt % superaddition to the inorganic ceramic-forming ingredients.

21. The method of claim 1, wherein the inorganic ceramic-forming ingredients comprise at least one of: cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, silicon carbide, silicon nitride, soda lime, aluminosilicate, borosilicate, soda barium borosilicate, or a mixture of thereof.

22. The method of claim 1, wherein the ceramic-forming ingredients comprise one or more of the group consisting of sources of alumina, titania, silica, and magnesia, and combinations thereof.

23. The method of claim 1, further comprising heating the green body sufficient to produce a predominant ceramic phase.

* * * * *